United States Patent

Sudau

[11] Patent Number: 6,026,940
[45] Date of Patent: Feb. 22, 2000

[54] LOCKUP CLUTCH WITH A COMPENSATION FLYWHEEL MASS AT THE TORSIONAL VIBRATION DAMPER

[75] Inventor: Jörg Sudau, Niederwerrn, Germany

[73] Assignee: Mannesmann Sachs AG, Schweinfurt, Germany

[21] Appl. No.: 09/239,218

[22] Filed: Jan. 28, 1999

[30] Foreign Application Priority Data

Feb. 4, 1998 [DE] Germany .......................... 198 04 227

[51] Int. Cl.[7] .............................. F16D 33/00; F16H 45/02
[52] U.S. Cl. .......................... 192/3.28; 192/3.29; 192/3.3
[58] Field of Search .................................. 192/3.28, 3.29, 192/3.3, 103 R; 74/574

[56] References Cited

U.S. PATENT DOCUMENTS

| | | | |
|---|---|---|---|
| 5,215,173 | 6/1993 | Gimmler | 192/3.3 |
| 5,836,217 | 11/1998 | Sudau et al. | 74/574 |

FOREIGN PATENT DOCUMENTS

| | | | |
|---|---|---|---|
| 41 21 586 | 1/1993 | Germany | F16H 45/02 |
| 196 18 864 | 11/1997 | Germany | F16F 15/131 |

*Primary Examiner*—Rodney H. Bonck
*Assistant Examiner*—Tisha D. Waddell
*Attorney, Agent, or Firm*—Cohen, Pontani Lieberman & Pavane

[57] ABSTRACT

A lockup clutch at a hydrodynamic torque converter is constructed with a torsional vibration damper which has a drive-side transmission element and a driven-side transmission element which is rotatable relative to the latter. Both of the transmission elements are provided with driving devices for driving elastic elements of a damping device. A carrier for a compensation flywheel mass is associated with the driven-side transmission element, wherein the carrier is connected with the turbine wheel on the one hand and with the driven-side driving device of the elastic elements on the other hand so as to be fixed with respect to rotation relative thereto and is provided at least with a cutout for receiving the compensation flywheel mass. The cutout has a guide path at least in its area of contact with the compensation flywheel mass, which guide path allows a movement of the compensation flywheel mass with at least one component perpendicular to the radial direction at the carrier.

6 Claims, 2 Drawing Sheets

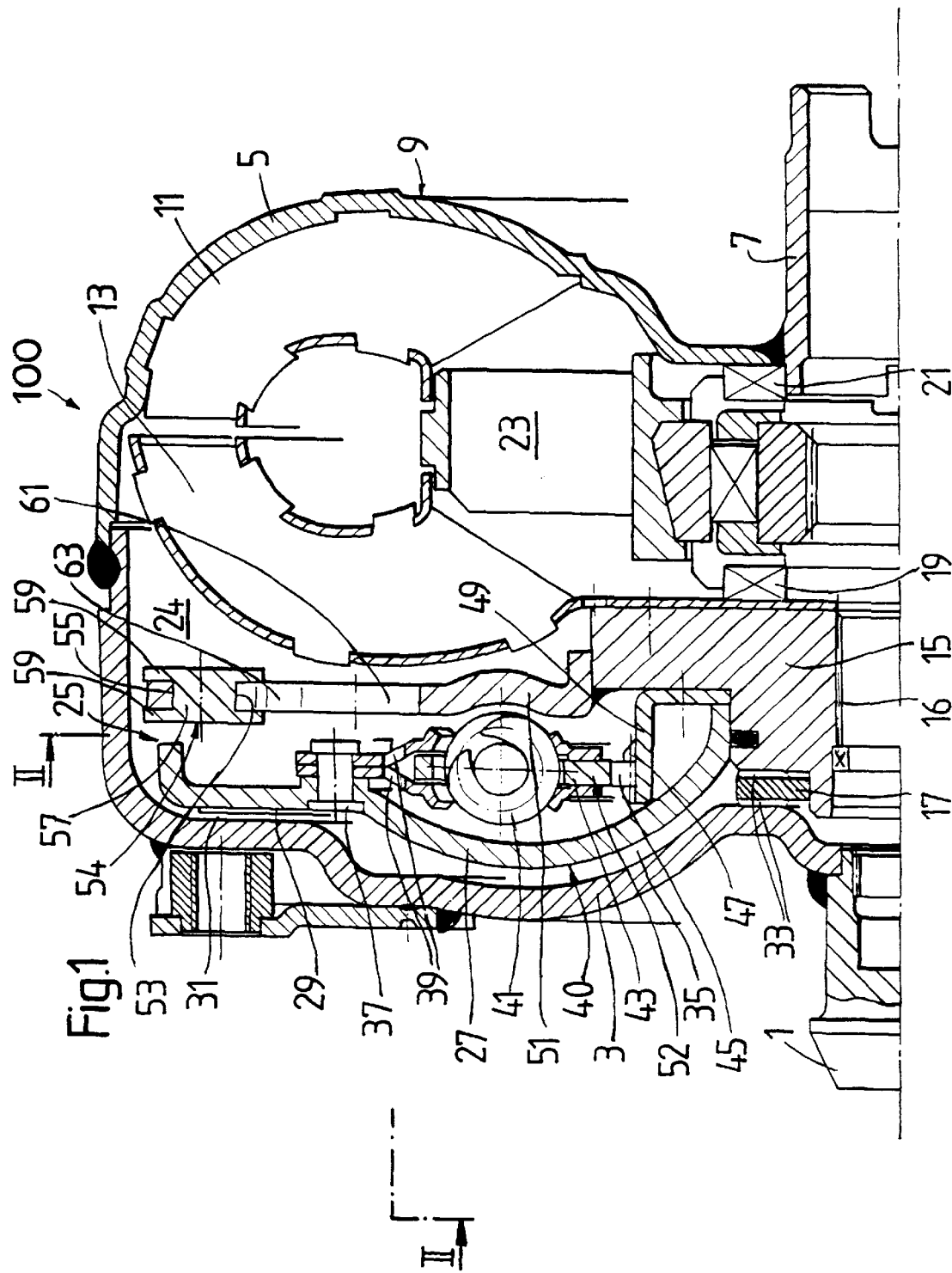

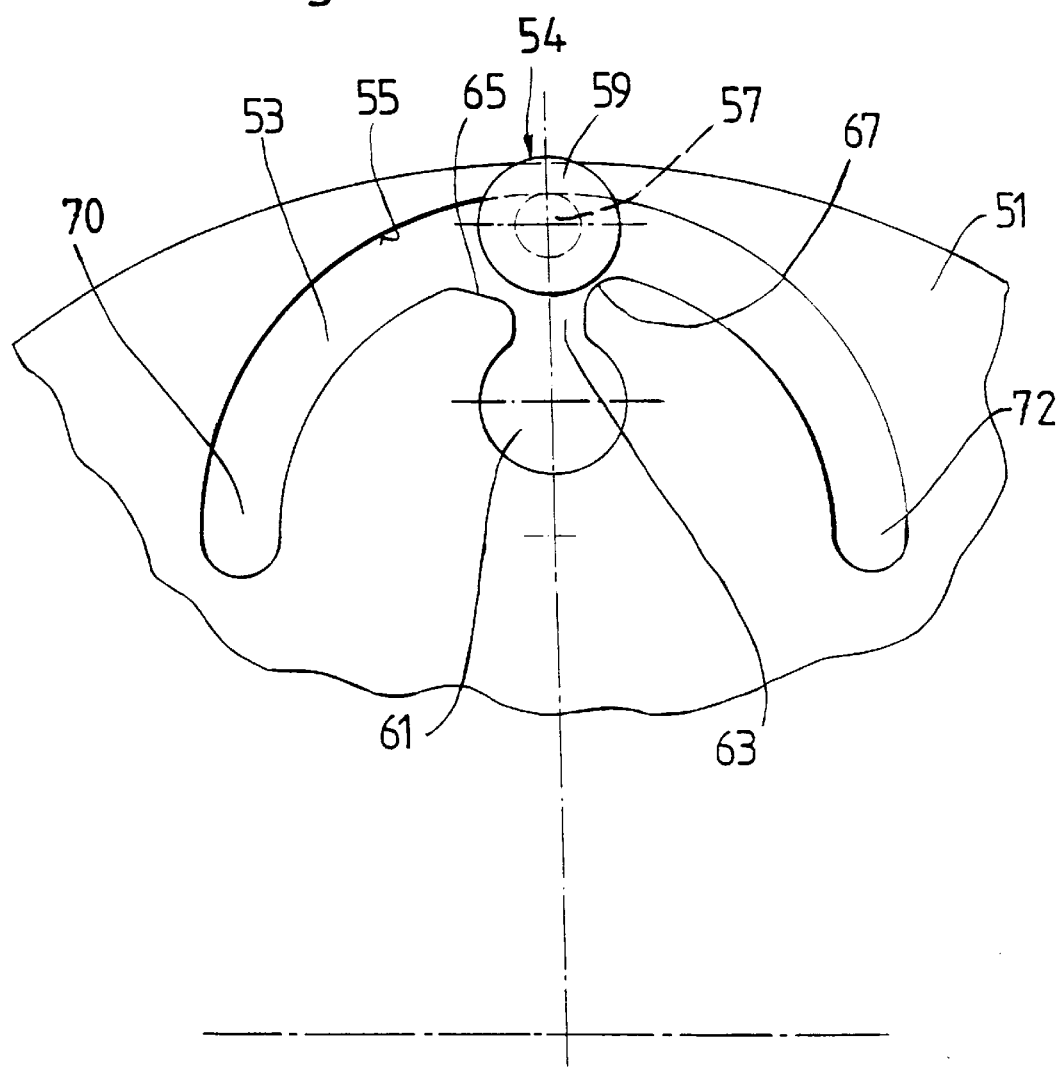

a# LOCKUP CLUTCH WITH A COMPENSATION FLYWHEEL MASS AT THE TORSIONAL VIBRATION DAMPER

BACKGROUND OF THE INVENTION

1. Field of the Invention

The present invention is directed to a lockup clutch for a hydrodynamic torque converter with a torsional vibration damper.

2. Description of the Related Art

A prior art lockup clutch is disclosed by FIGS. 1 and 2 of reference DE 41 21 586 A1. This prior art lockup clutch is arranged in a hydrodynamic torque converter axially between the converter housing and the turbine wheel. The lockup clutch has a piston which is arranged so as to be rotatable and axially displaceable on a turbine hub. The lockup clutch also acts, via a rivet connection, on driving means on a drive side for elastic elements of a damping device. The lockup clutch forms, with these driving means, a drive-side transmission element of a torsional vibration damper of the lockup clutch. The elastic elements in the form of circumferential springs couple the drive-side driving means with a driven-side driving means in the form of a hub disk which is provided with an inner toothing for meshed coupling with an outer toothing of a carrier which is fixed with the turbine hub so as inot to be rotatable relative to it. The driven-side driving means. together with the holder, forms a driven-side transmission element of the torsional vibration damper of the lockup clutch.

In this torsional vibration damper, the transmission elements which act relative to one another via the damping device operate in such a way that a complete frequency range can be filtered. However, torsional vibrations of a determined order cannot be overcome.

In another prior art vibration damper disclosed, for example, in FIG. 1 of DE 196 18 864 A1, a torsional vibration damper which is constructed with a drive-side transmission element in the form of a first flywheel mass and, rotatable thereto, a driven-side transmission element in the form of a second flywheel mass. Both flywheel masses have driving means for elastic elements of a damping device which act in the circumferential direction between the flywheel masses. The driven-side transmission element has a recess or cutout in which a compensation flywheel mass is arranged so as to be movable along a guide path. Both the guide path and the compensation flywheel mass are constructed with a curvature, so that a rolling movement of the compensation flywheel mass is carried out along the guide path when a torsional vibration is introduced. On the one hand, because of the two flywheel masses connected with one another by a damping device, a complete frequency range can be filtered with a device of the kind mentioned above, that is, amplitudes of different orders are damped, while, on the other hand. torsional vibrations of a determined order at determined amplitude magnitudes can be reduced by a determined amount in an outstanding manner due to the compensation flywheel mass.

SUMMARY OF THE INVENTION

It is the object of the invention to construct the torsional vibration damper at the lockup clutch of a hydrodynamic torque converter in such a way that torsional vibrations delivered by a drive, for example, by an internal combustion engine, can be filtered out to the greatest possible extent.

This object is met by a lockup clutch for use with a hydrodynamic torque converter including a torsional vibration damper having an elastic element, a drive-side transmission element rotatable about an axis of rotation and having driving means drivably connectable for driving one side of the elastic element , and a driven-side transmission element rotatable relative to said drive-side transmission element about said axis of rotation and having driving means drivably connectable for driving the other side of the elastic element, the lockup clutch further including a compensation flywheel mass and a carrier connected with the driven-side transmission element and connectable with a turbine wheel of the hydrodynamic torque converter, the carrier having a cutout for receiving the compensation flywheel mass, and the cutout comprising a guide path for the compensation flywheel mass operatively arranged for allowing movement of the compensation flywheel mass for reducing an acceleration of the driven side transmission element, at least one component of said movement of said compensation flywheel mass being perpendicular to a radial direction relative to the carrier.

Through the construction of the torsional vibration damper at a lockup clutch of a hydrodynamic torque converter around a compensation flywheel mass, the acceleration at the transmission input shaft can be reduced over the entire speed range and function range. In this respect, the compensation flywheel mass is adjusted to a determined order of vibration excitation. Through the arrangement of the compensation flywheel mass on the side of the turbine wheel, the compensation flywheel mass is also effective during the switching processes at the lockup clutch, so that the slip phase is appreciably reduced during engagement of the clutch because the engagement shock transmitted to the gear unit is reduced.

Through the construction of the compensation flywheel mass with an axial center pin and securing flanges which act at the latter on both sides and whose outer dimensions exceed the dimensions of the cutout vertical to the guide path, it is ensured that the compensation flywheel mass cannot exit from the cutout and, therefore, from the guide path. However, to move a compensation flywheel mass of this type into the cutout, an insertion or lead-in located radially inside of the cutout is associated with the cutout. At a low rate of rotation of the transmission elements of the torsional vibration damper, for example, during the shut down phase of the engine in which the compensation flywheel mass is only slightly subject to the effect of centrifugal force and, in some cases, no longer contacts the guide path, the compensation flywheel mass should be prevented from falling inward and thus reaching the area of the lead-in, from which it could exit the transmission element. To prevent this occurrence, an access provided radially between the cutout and the lead-in adjoins the cutout via a connection, wherein this access should cause the compensation flywheel mass to remain in the cutout. According to the invention, the compensation flywheel mass usually moved in one direction along the guide path during the shut down phase of the engine. Therefore, a flat connection arranged on a side of the access toward which the compensation flywheel mass normally moves prevents the compensation flywheel mass from falling into the lead-in with a component vertical to the radial direction, so that the compensation flywheel mass is drawn away from the internal combustion engine via the lead-in and thus comes to rest in the end position portion of the cutout. A steep connection between the access and cutout is arranged on the other side of the access opposing the direction in which the compensation flywheel mass normally moves, due to an ascending path in the area of extension of the connection and due to a small radius at this location, the compensation flywheel mass is drawn away over the access during its movement in the direction of the guide path.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 shows the upper half of a longitudinal section through a hydrodynamic torque converter with a lockup clutch and a torsional vibration damper with a compensation flywheel according to an embodiment of the present invention; and FIG. 2 shows a view of a radially outer area of a carrier of the lockup clutch of FIG. 1 which receives the compensation flywheel mass.

DETAILED DESCRIPTION OF THE PRESENTLY PREFERRED EMBODIMENTS

FIG. 1 shows a hydrodynamic torque converter 100 having a bearing journal 1 from which a primary flange 3 extends radially outward. The primary flange 3 is fixedly connected to an impeller shell 5 that carries a converter hub 7 at its radial inner end. The primary flange 3 and the impeller shell 5 form a converter housing 9 of the torque converter 100.

The impeller shell 5 has a vane arrangement for forming an impeller wheel 11 of the torque converter 100. The impeller wheel 11 cooperates with a turbine wheel 13 which also has a vane arrangement. The turbine wheel 13 is fastened to a turbine hub 15 which has an inner toothing 16. The turbine hub 15 is connectable with a conventionally constructed driven shaft via the inner toothing 16. For example, a driven shaft of the kind shown and described in reference DE 41 21 586 A1 which was cited above, may be used.

The turbine hub 15 is clamped between an axial bearing 17 and an axial bearing 19. The axial bearing 17 separates the turbine hub15 from the primary flange 3. The axial bearing 19, together with another axial bearing 21 which is supported in the region of the converter hub 7 at the converter housing 9, fixes a stator wheel 23 which, together with the impeller wheel 11 and the turbine wheel 13, forms a hydrodynamic converter circuit 24.

A lockup clutch 25 having, a piston 27 which is mounted on the turbine wheel 15 so as to be rotatable and axially displaceable is provided axially between the primary flange 3 and the turbine wheel 13. A radial outer end of the piston 27 has a friction facing 29 that cooperates with a friction surface 31 on the primary flange 3. Pressure may be applied to the back of the piston 27 by the converter circuit 24, so that the friction facing 29 of the piston 27 contacts the friction surface 31 and at torque which is introduced at the converter housing 9 can be transferred to the piston 27. A chamber 35 which is situated axially between the primary flange 3 and the piston 27 may be supplied with pressure medium via grooves 33 in the axial bearing 17 for a lifting of the piston 27 from the primary flange 3. In this connection, reference is also had to the above-mentioned reference DE 41 21 586 A1 for an example of a means for supplying the pressure medium to the chamber 35.

The piston 27 has a rivet connection 37 with drive-side driving means 39 in the form of cover plates, together with which it forms a drive-side transmission element 40. The drive-side driving means 30 act, via elastic elements 41 which are preferably springs oriented in the circumferential direction, at driven-side driving means 43 in the form of a hub disk having an inner toothing 45 by which it engages with an outer toothing 47 of a holder 49. The turbine hub 15 fixedly receives a carrier 51 for a compensation flywheel mass 54, wherein this compensation flywheel mass 54, together with the driven-side driving means 43 and the holder 49, forms a transmission element 52 on the driven side. Torsional vibrations that are introduced from the converter housing 9 via the piston 27 will consequently cause a deflection of the compensation flywheel mass 54 in opposition to the working direction of the torsional vibrations, so that the compensating function of this compensation flywheel mass 54 takes effect. The basic manner of operation of a compensation flywheel mass 54 in a torsional vibration damper is, for example, described in the above-cited DE 196 18 864 A1.

FIG. 2 shows the construction of a carrier 51 in the area of extension of a cutout 53 which acts in the radial outer area as a guide path 55 for the compensation flywheel mass 54. With increasing deflection from its center position in the circumferential direction, the compensation flywheel mass 54 is increasingly forced radially inward. The inward movement of the compensation flywheel mass 54 occurs against the applied centrifugal force, so that, as the deflection increases, the impression is given that the deflection is carried out against a spring of increasing stiffness.

Referring again to FIG. 1, the compensation flywheel mass 54 has a center pin 57 by which it is guided into the cutout 53. Axially adjoining this center pin 57 on both sides are securing flanges 59 which are constructed such that their diameter is greater than the radial extension of the cutout 53 and the compensation flywheel mass 54 is accordingly prevented from falling out of the cutout 53. But in order for the compensation flywheel mass 54 to be inserted without difficulty into the cutout 53, as is shown in FIG. 2, a lead-in 61 is provided radially inside of the cutout 53. The diameter of the lead-in 61 is constructed such that a securing flange 59 slides through axially and therefore the compensation flywheel mass 54 can be inserted. During rotational movement of the torsional vibration damper, the compensation flywheel mass 54, due to centrifugal force, moves radially outward via an access 63 which couples the lead-in 61 to the cutout 53. The access 63 is constructed as a bottleneck and has, at both sides, a connection 65, 67 for the cutout 53. The connection 65 extends flat as shown on the left-hand side of the view in FIG. 2, but is very steep according to the construction shown on the right-hand side. The shapes of the connections are designed to prevent the compensation flywheel mass 54 from falling back into the lead-in 61 and possibly exiting the carrier 51 even when the engine is shut off. The centrifugal force acting on the compensation flywheel mass 54 at a low rate of rotation of the carrier 51, for example, when the internal combustion engine is shut down, is so slight that the compensation flywheel mass 54 may possibly no longer contact the radial outside of the guide path 55. However, since, at the same time, a component always acts on the compensation flywheel mass 54 in the direction of extension of the guide path 55 because of torsional vibrations, this compensation flywheel mass 54 is conducted in the direction of the lateral extension of the cutout 53 over the flat connection 65 and drops into this portion 70 of the cutout 53 as the rate of rotation further decreases. A similar effect is caused by the steep connection 67. However, due to the fact that its path continues to ascend at the access 63 and because of its small radius, this steep connection 67 provides that the compensation flywheel mass 54 is drawn over the access 63 and falls into the corresponding portion 72 of the cutout 63. Therefore, the compensation flywheel mass 54 is prevented from falling back into the lead-in 61 and possibly exiting the carrier 51 even when the engine is shut off.

The invention is not limited by the embodiments described above which are presented as examples only but can be modified in various ways within the scope of protection defined by the appended patent claims.

We claim:

1. A lockup clutch for use with a hydrodynamic torque converter, comprising:

a torsional vibration damper having an elastic element having a first end and a second end, a drive-side transmission element rotatable about an axis of rotation and having driving means drivably connectable for driving said first end of said elastic element, and a driven-side transmission element rotatable relative to said drive-side transmission element about said axis of rotation and having driving means drivably connectable for driving said second end of the elastic element;

a compensation flywheel mass; and a carrier connected with said driven-side transmission element and connectable with a turbine wheel of the hydrodynamic torque converter, said carrier having a cutout for receiving said compensation flywheel mass, and said cutout comprising a guide path for said compensation flywheel mass operatively arranged for allowing movement of said compensation flywheel mass for reducing acceleration of said driven side transmission element, at least one component of said allowed movement of said compensation flywheel mass being perpendicular to a radial direction relative to said carrier.

2. The lockup clutch of claim 1, wherein said drive-side transmission element comprises a piston, said carrier for said compensation flywheel mass being arranged axially between said piston and the turbine wheel of the hydrodynamic torque converter, and a radially inner end of said carrier being rotatably fixedly connected with said driving means of said driven-side transmission element.

3. The lockup clutch of claim 1, wherein said compensation flywheel mass comprises an axial center pin penetrating said cutout and securing flanges connected at both axial ends of said center pins, said flanges having a larger dimension than a dimension of said cutout perpendicular to said guide path, thereby retaining said compensation flywheel mass in said cutout.

4. The lockup clutch of claim 1, wherein said carrier comprises a lead-in portion for insertion and removal of said compensation flywheel mass arranged radially inside of said cutout and connected with said cutout via an access.

5. The lockup clutch of claim 4, wherein said access passes into said cutout via a flat connection operatively arranged for preventing said compensation flywheel mass from entering said access during a decrease in rotational speed of the torque converter.

6. The lockup clutch of claim 4, wherein said access comprises a steep connection to said cutout so that said access is only slightly wider than an outer diameter of said center pin until the immediate area of transition to said cutout, said steep connection being operatively arranged for preventing said compensation flywheel mass from entering said access during a decrease in rotational speed of the torque converter.

* * * * *